April 30, 1935. C. C. DOUGLAS 1,999,870
BATTERY SHIELD
Filed July 22, 1932
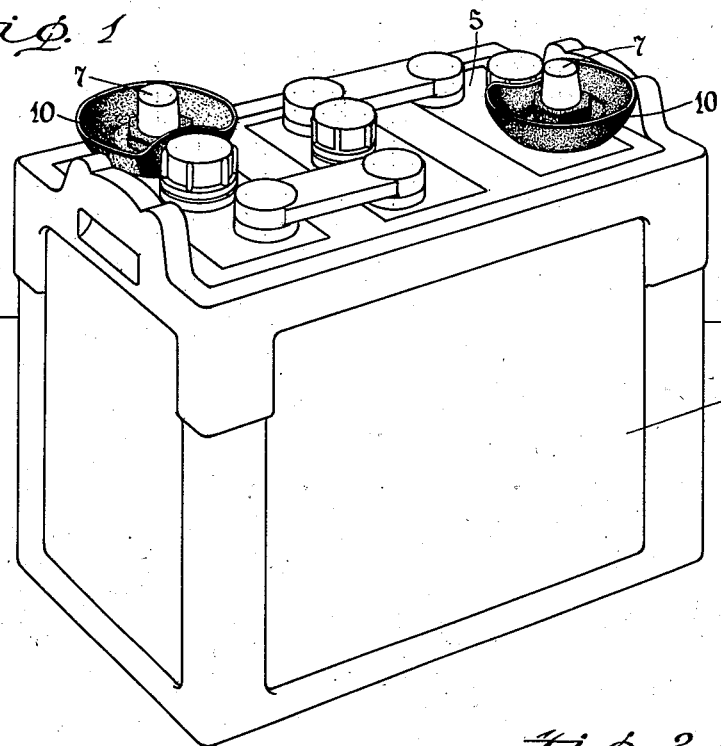
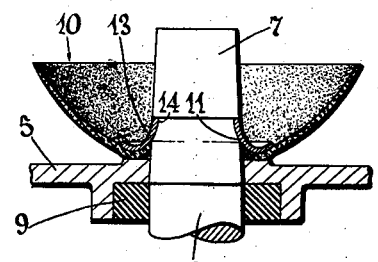
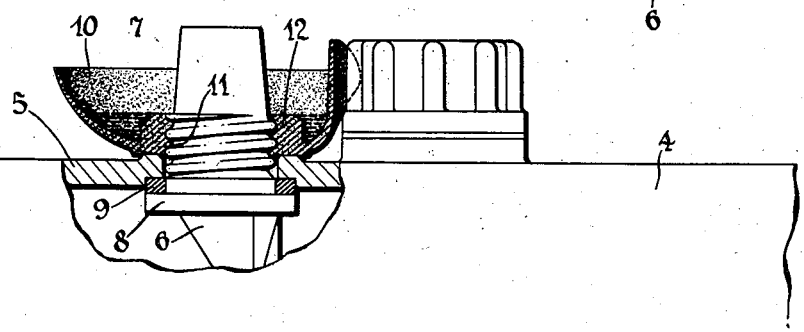
INVENTOR
BY Charles C. Douglas
Beau & Brooks ATTORNEY Patented Apr. 30, 1935

1,999,870

UNITED STATES PATENT OFFICE 1,999,870

BATTERY SHIELD

Charles C. Douglas, Buffalo, N. Y.

Application July 22, 1932, Serial No. 624,001

6 Claims. (Cl. 173—259)

This invention relates to protectors or shields for use on electrical connections, particularly for application to storage battery connecting terminals for preventing corrosion between the battery terminals and connecting leads applied thereto.

It is well known that corrosive action will take place in battery connection parts whenever an acid solution of the kind that is used in storage batteries enters the joint or contact between them with the result that an intimate contact between the two members is lost and many troubles and annoyances incidental to a loosened connection ensue. It has been well known that this trouble will occur whenever the battery terminal post which extends through an aperture in the top cover member of the battery becomes loosened in its socket to the extent that acid solution will be permitted to work its way up along the terminal post past the cover plate and to the upper end of the post where the connection with the lead wire is made. In order to prevent this a number of schemes have been devised, usually along the line of a supplementary joint packing or sealing washer located about the battery post just above the point where it emerges from the battery cover plate. These schemes constitute attempts to double seal the joint or, in other words, to merely strengthen it for resistance to seepage of acid solution from the interior of the battery through the cover plate and thence up to the upper end of the terminal post.

It has been found, however, that in addition to leakage through the top plate of a battery case around the terminals there are other ways in which acid will be enabled to find its way to the point of connection. Regardless of how leakproof this joint may be where the terminal post emerges through the cover plate, there usually will be a continuous accumulation of acid in the connection, with the result that corrosion starts in and destroys the electrical effectiveness of the connection. The source of this trouble lies in accumulations of acid solutions which form on the upper surface of a battery case as a result of spilling when the battery is being serviced with solution, or it may be splashed out of filler cap vent holes when the battery is joggled. It is common knowledge, for example, that when a storage battery is in use in an automobile, its top surface is at least dampened and usually saturated, with varying amounts of acid solution. In addition to this, a layer of dust or dirt is usually present on the surfaces of the top cover and the various parts which project therefrom. This coating of dust provides a medium whereby the acid solution is enabled to creep across the surface of the top plate and up the sides of the terminal post in a manner typical of capillary action.

The chief object of this invention is to provide a shield or protector which will prevent the travel of acid solution from any source whatsover to the upper end of a battery terminal or wherever a connection is to be made, and is an improvement over my Patent No. 1,609,799 granted December 7, 1926 which shows broadly means for the same purpose.

Another object of this invention is to provide a corrosion prevention shield or protector for battery terminals which shall be so flexible and deformable as to be readily applicable to a variety of types of batteries, and adjustable to meet a variety of conditions and to avoid all other members projecting from a battery top cover.

Another object of the invention is to provide a corrosion preventing shield for battery terminals which may be readily and quickly applied to a battery terminal post and which will greatly strengthen the assembly of the battery plate and terminal post members within the battery case when it is applied thereon.

Another object of the invention is to provide a corrosion preventing shield for battery terminals of simple and sturdy construction that is economical to manufacture and easy to apply.

In the drawing:

Fig. 1 is a perspective view of a storage battery equipped with my invention;

Fig. 2 is a fragmentary view of a storage battery in elevation with parts of a side wall cut away, and showing a battery terminal post and a vertical sectional view of one form of my improved shield in position thereon; and Fig. 3 is a vertical sectional view through another form of my improved shield in position on a battery terminal post.

In practicing the invention a conventional type of storage battery case 4 having a top cover member 5 is provided and is formed with apertures through which extend terminal posts 6 as shown in Figs. 2 and 3. These terminal posts are usually formed of lead or other suitable metal and are connected at their lower ends to the battery plates and grids by conventional means (not shown). For use common to the modern automobile, the upper ends of the terminal posts are usually formed into frustro-conical shape as at 7, and are adapted to be accurately received by a split-ring type of lead wire clamp. There are, of course, a variety of other forms of lead wire clamps in use, and in each case the upper end of the terminal posts will be shaped to properly coact with the clamp to provide a tight and sturdy electrical connection; but regardless of which type of connector parts are to be used, my invention will be just as readily applied and will be just as effective as it is in use in combination with the style illustrated in the drawing.

In storage battery manufacture the terminal posts are usually, but not always, formed with a shoulder as at 8. When this construction is used lock nuts may be threaded upon the upper end of the terminal post in such manner as to cooperate with the shoulder to rigidly clamp the terminal post and the top cover member of the battery case together. With a construction of this type, the connection between the terminal post and the battery case cover is relied upon to partly support the plates or grids which are disposed within the body of the battery case under electrolyte solution.

In addition to damage which may occur to the plates and battery parts when they are permitted to work loose in their case, there will be a continuous leakage of acid solution from the battery case out through the opening formed where each terminal post passes through the battery case. It has for some time, therefore, been the aim of manufacturers to rigidly and sturdily fix the terminal posts to the battery case cover at the point where they pass through the cover, and to seal the joint against leakage of acid. For this latter purpose a gasket or packing member 9 is usually provided, with varying degrees of effectiveness. As pointed out above, however, under continued vibration and stresses the most carefully sealed joints will open and acid will find its way to the upper surface of the top cover and over the several parts projecting therefrom. In addition, there is the ever present possibility of acid spilling over the upper surface of the battery by the mechanic who services the battery with solution.

My improved shield embodies broadly an enlarged disc member 10, one form of which is shown. It can be of circular shape having widely extending side flanges bent upwardly, and may resemble in appearance an ordinary tea cup. An opening 11 in the bottom portion of member 10 permits of application to the terminal post of a battery so that it encircles the post completely, with the bottom portion resting on the battery top cover 5, as clearly shown in Figs. 2 and 3. The shield may be applied in several ways to obtain an acid-proof joint, as for example by welding, soldering, or by screw-threading or force-fitting in combination with any form of suitable cementing material.

Fig. 2 illustrates one form of connection, in which an enlarged ring member 12 around the aperture 11 is provided with screw threads for cooperation with screw threads formed on the terminal post. In this form, the shield replaces the ordinary screw threaded nut which is usually provided by the battery manufacturer to anchor the terminal post to the battery case cover, and at the same time, it will effectively guard the upper end of the terminal post from acid. Figure 3 illustrates another form in which the connection between the shield and the battery terminal may be made. It comprises a ferrule or ring-shaped member 13 made of metal or other suitable material, and is formed with a central opening of slightly smaller diameter than that of the terminal post at the location where the shield and ferrule are finally secured. The ferrule member 13 is securely fastened to the bottom portion of the disc 10 by means of soldering or welding or some other suitable means, and by forcing the shield downwardly upon the terminal post the ferrule member is thus locked or wedged firmly upon the terminal post and provides a tight and sturdy connection. The exposed edges of the joining parts can be coated with solder, or the like, in order to make it doubly sure that the joint will be acid proof. If preferred, the ring shaped member 13 may be formed with a central opening of a diameter only slightly smaller than the diameter of the terminal post at the location where the shield and ferrule are finally secured, so that when the shield is pressed downwardly upon the terminal post there will be no substantial stress transmitted to the battery plates or other parts of the battery, which otherwise might be damaged. When the shield is in position a shoulder may be formed upon the terminal post abutting the upper margin of the ferrule by any well known crimping or spinning method, to firmly hold the shield in position on the terminal post. Or, if preferred, the ferrule may be crimped into the terminal post by any suitable tool, as shown at 14.

When applied to the upper end of a terminal post as shown, my shield presents a fence or guard between that part of the post where the connector clamp is to be applied and any acid solution which may be present on the top surface of the battery case from any cause whatsoever. From this description it will be apparent that a long and tortuous path is thus presented to the creeping acid, and hence the battery terminal connections will be completely protected.

The disc member 10 is preferably made of sheet lead or some other material which has the propery of holding shape and yet which will be pliable and readily deformable so that it can be bent out of its normally curved form without the use of tools, and so that it will hold its new deformed shape without further attention or assistance.

In order to prevent "acid creep" past the rim of my shield, the sides of the disc should not be allowed to contact with the battery case top or any projecting members which might have a coating of dust and acid solution. To avoid such objects the disc may be readily deformed as shown in Fig. 1 and Fig. 2 and, because it retains its shape, no further attention is required after it is adapted to its job. In this way I have provided a battery terminal shield which may be economically made in a single style and size and yet it may be readily and conveniently adapted to suit varying conditions when being applied to batteries of different designs.

What is claimed is:

1. In a storage battery, a casing having corrosive acid therein, a terminal post extending from the battery and having an upper end portion exposed, a corrosion-insulating, cup-shaped metal shield having an opening through its central portion, said terminal post being disposed through said opening in acid tight relation and projecting into the cupped portion of the shield to present the exposed end of the terminal post for direct connection to an electric conductor, said metal shield having a relatively thin metallic rim portion deformable without the use of tools to avoid contact with adjacent portions of the battery.

2. In a storage battery, a casing having corrosive acid therein, an apertured casing wall portion, a terminal post disposed through said apertured wall portion and having its projecting end portion exposed outwardly for connection directly to an electric conductor, said terminal post having a shoulder abutting the inner surface of the apertured wall portion, a clamping ring encircling the projecting end portion of the terminal post and cooperating with said shoulder in clamping the post to the apertured wall portion, said clamping ring having a relatively thin cup-like flange, readily deformable to clear obstructions adjacent the terminal post, extending laterally and upwardly to form a flaring wall spaced from the post whereby acid is prevented from reaching the projecting end of the terminal post.

3. In a storage battery having corrosive acid therein, a casing for containing the acid and having an apertured wall portion, a screw-threaded terminal post disposed through said apertured wall portion and having an outwardly projecting end portion exposed for direct connection to an electric conductor, said terminal post having a shoulder abutting the inner surface of the apertured wall portion, a screw-threaded clamping ring threaded upon the terminal post whereby the apertured wall portion is clamped in acid-tight relation between the ring and shoulder, said clamping ring having a cup-shaped flange, readily deformable to clear obstructions adjacent the terminal post, extending laterally outwardly from the ring base and turned upwardly to protect the projecting end of the terminal post from corrosive action of the acid.

4. In a storage battery having corrosive acid therein, a terminal post projecting from the battery and having its end exposed for connection directly to an electric conductor, other instrumentalities projecting from the battery, a relatively thin, cup-shaped shield member fitted about the post and deformed to clear said other instrumentalities, an annular member included rigidly at the central portion of the shield member in acid-tight relation therewith and having a central opening through which the post is disposed, said annular member engaging the post in acid-tight relation.

5. In a storage battery having corrosive acid therein, a terminal post projecting from the battery and having its end exposed for connection directly to an electric conductor, a relatively thin cup-shaped shield member having an opening through its central portion, said terminal post being disposed through said opening and having an annular recess formed therein, and an annular member included rigidly at the central portion of the shield member in acid tight relation therewith, the inner periphery of said annular member engaging said annular recess in acid-tight relation with said post.

6. In a storage battery having corrosive acid therein, a terminal post projecting from the battery and having its end exposed for connection directly to an electric conductor, a shield member having an opening through its central portion, said terminal post being disposed through said opening and having an annular recess formed therein, and an annular member included rigidly at the central portion of the shield member in acid tight relation therewith, the inner periphery of said annular member engaging said annular recess in acid-tight relation with said post.

CHARLES C. DOUGLAS.